United States Patent Office 3,523,953
Patented Aug. 11, 1970

3,523,953
ULTRA-VIOLET LIGHT ABSORBING COMPOUNDS
Albert F. Strobel, Delmar, and Sigmund C. Catino, Castleton, N.Y., assignors to GAF Corporation, a corporation of Delaware
No Drawing. Filed Jan. 6, 1967, Ser. No. 607,649
Int. Cl. C07d 63/12
U.S. Cl. 260—332.2                                 5 Claims

ABSTRACT OF THE DISCLOSURE

Esters and amides of $\alpha$-cyano-$\beta$-alkyl or alkenyl-$\beta$-heteroacrylic acid having ultra-violet light absorbing properties and useful as sun-screen agents and for protecting organic materials against degradation by UV radiation.

---

This invention relates to new and useful ultra-violet light absorbing compounds and to methods for employing same, and to compositions which are protected against the degradative action of ultra-violet light, and in particular to compounds useful as sun-screen agents and their use in protecting organic materials including the human skin against the burning and degrading effects of sunlight.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

In the area of sun-screen agents for protecting the skin, the most detrimental wavelengths are those from about 2900 to 3100 A. In this range severe burning results. From about 3200 to 3500 A. the sun's radiations generally produce a tanning of the skin. For effective sun-screening a compound or composition should, at least, remove substantially all of the burning rays, and in many instances a good portion of the tanning rays. For many applications the compounds should be light-fast for hundreds of hours but in other applications, this is not important. Thus, for sun-screening on the skin, only a few hours light-fastness is necessary, but here it is more desirable to have a compound which has more affinity for the skin to assure adequate protection.

It is therefore an object of the present invention to provide new and useful ultra-violet light absorbing compounds.

It is still another object of this invention to provide new and useful ultra-violet light absorbing compositions.

Still another object of this invention is to provide new and useful methods for protecting organic materials against the degradative effects of ultra-violet light employing the compounds herein disclosed.

It is still a further object of this invention to provide compounds which are outstanding sun-screen agents and for methods for protecting human skin against the burning and degradative effects of sunlight.

Other objects will appear as the description proceeds.

It has now been discovered that an outstanding class of ultra-violet absorbing compounds are represented by the following general formulae:

(I)

wherein $R_1$ is alkyl of 1 to about 30 carbon atoms or alkenyl of 3 to about 30 carbon atoms, Het represents a hetero nucleus containing at least one pair of conjugated double bonds, and X may be CN or COY wherein Y is $OR_2$ or

wherein $R_2$, $R_3$ and $R_4$ may be hydrogen, alkyl, substituted alkyl, aryl, substituted aryl, or hetero, and

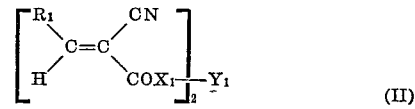
(II)

wherein $R_1$ is as defined above, $X_1$ is —O— or —$NR_3$—; $R_3$ is defined above and $Y_1$ is bivalent bridging radical which may be alkylene, arylene or hetero and which may contain non-chromophoric substituents. As illustrative $R_1$ substituents, there are the following:

methyl
ethyl
n-propyl
iso-propyl
n-butyl
iso-butyl
tertiary-butyl
secondary-butyl
n-amyl
iso-amyl
tertiary-amyl and the other isomeric amyls
n-hexyl
iso-hexyl and the other isomeric hexyls
n-heptyl
iso-heptyl and the other isomeric heptyls
n-primary nonyl (nonyl-1)
nonyl-(2)
nonyl-(3)

nonyl-(5)
2-methyl-octyl-2
4-ethyl-heptyl-4
2-methyl-4-ethyl-hexyl-4
n-primary octyl
octyl-(2) (capryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-primary decyl (decyl-1)
decyl-4 (secondary decyl)
2-ethyl-octyl-3 (tertiary decyl)
4-propyl-heptyl-4 (tertiary decyl)
undecyl-1 (n-primary decyl)
undecyl-2 (n-secondary decyl)
dodecyl-1 (n-dodecyl)
tridecyl-1 (n-tridecyl)
tridecyl-7
3-ethyl-undecyl
tetradecyl-1 (n-tetradecyl)
pentadecyl-1 (n-pentadecyl)
pentadecyl-8
hexadecyl (cotyl)
heptadecyl-9
octadecyl-1
2-methyl heptadecyl-2
eicosyl-1
docosyl-1
tricosyl-12
tetracosyl
tricapryl
pentacosyl
hexacosyl
heptacosyl
octacosyl
nonacosyl
myrisyl (30 carbons)
alkenyl
allyl ($CH_2=CHCH_2-$)
methallyl ($CH_2=C(CH_3)CH_2-$)
crotyl ($CH_3CH=CHCH_2-$)
butenyl-1 ($CH_2=CH-CH-CH_3$)
pentenyl-1
γ-isopropyl allyl
β-ethyl-3-propyl allyl
2-methyl-octenyl-6
decenyl-1
decenyl-2
undecenyl
dodecenyl-2
octadecenyl
docosenyl
pentamethyl eicosenyl In addition to the alkyl or alkenyls mentioned, substituted alkyls which are devoid of nitro groups and groups which are strongly bathochromic, may be used. These include the hydroxyalkyls, cyanoalkyls, haloalkyls (e.g., chloroalkyl, fluoralkyl, bromoalkyl, etc.), alkoxyalkyls, carbalkoxyalkyls, hydroxyalkoxyalkyls and the like. As suitable $R_2$, $R_3$ and $R_4$ substituents, mention may be made of the $R_1$ substituents along with the following illustrative aryl and heterocyclic groupings (the latter suitable as Het groups, too).

phenyl
tolyl
xylyl
cumyl
α-naphthyl
diphenyl and the alkyl substituted derivatives thereof
substituted aryls, e.g.

β-naphthyl
α-anthraquinonyl
β-anthraquinonyl
γ-anthraquinonyl
phenanthranyl anisole
phenetole
p-diethoxyphenyl
1-methoxy phenanthryl
α-naphthylmethylether
β-naphthylmethylether
α-naphthylethylether
β-naphthylethylether
hydroxyethyl phenyl
hydroxypropyl phenyl
chlorophenyl
bromophenyl
1,2-dichlorophenyl
1,3-dichlorophenyl
1,3,5-trichlorophenyl
1,2-dibromophenyl
α-chlorotolyl
m-chlorotolyl
m-bromotolyl
bromo-o-xylyl
α,β-dichloro naphthyl
4-bromoacenaphthyl
carboxyphenyl
carboxytolyls
carboxyxylyls
carbalkoxyphenyl, e.g.
carbomethoxyphenyl
carboethoxyphenyl
carbalkoxytolyls, e.g.
carbomethoxytolyls
acetophenyl
propiophenyl
butyrophenyl
lauroylphenyl
stearoylphenyl
p-acetotolyl
o-acetotolyl
α-benzoyl naphthyl
β-benzoyl naphthyl
acetaminophenyl
acet-methylamino phenyl
o-acetoaminotolyl p-acetoaminotolyl
α-acetoaminonaphthyl
β-acetoaminonaphthyl
propio-aminophenyl
butyro-aminophenyl
o-propio-aminotolyl
p-propio-aminotolyl
o-butyroaminotolyl
p-butyroaminotolyl
o-lauroylaminotolyl
p-lauroylaminotolyl
o-stearoylaminotolyl
p-stearoylaminotolyl
sulfamyl phenyl
sulfamyl naphthyl
heterocyclics
thiophene
furane
pyrrole
pyrane
thiapyrane
pyridine
1,2-dihydropyridine
oxazole
thiazole
isoxazole
isothiazole
pyrazole
3-isopyrazole
imidazole
1,2,3-triazole
1,2,4-triazole
tetrazole
1,3,4-oxadiazole
1,2,5-oxadiazole
1,2,3-thiadiazole
1,2,3-oxathiazole
pyridazine
pyrimidine
pyrazine
1,3,5-triazine and fused ring systems of benzene with the aforementioned heterocyclics, e.g.

benzothiophene
benzofurane
quinoline
phthalazine
benzimidazole
1,2,3-benztriazole
benzoxazole The heterocyclic nuclei may contain inert substituents, as the aryl moiety, which do not affect the function and stability of the compounds, but which may vary the ultraviolet absorption spectrum somewhat. These include:

alkyl (1 to about 50 carbon atoms)
alkenyl (1 to about 50 carbon atoms)
substituted alkyl (1 to about 50 carbon atoms) e.g., cyano-, hydroxy-, carbalkoxy-, chloro-, fluoro-, bromo-, iodo-, alkoxy-, hydroxyalkoxy-, etc.
halogen (F, Cl, Br, and I)
acyl (acetyl to about 50 carbon acyls and aroyl including multicyclics such as naphthoyl, anthranoyl, etc.)
sulfonyl (e.g., $CH_3SO_2-$; benzene $SO_2$, etc.)
oxy (OH; $CH_3O-$, etc.)
carboxamido (—CON<) and the like.

Exemplifications of bivalent $Y_1$ radicals are:

$$-CH_2CH_2-$$
$$-CH_2CH_2CH_2-$$
$$-CH_2CH_2CH_2CH_2-$$
$$-CH_2CH_2CH_2CH_2CH_2-$$

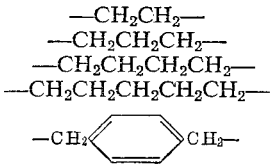

(1) 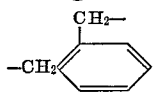
(2) 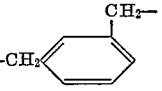
(3) 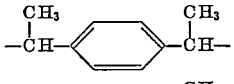
(4) 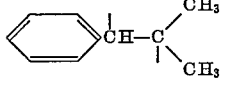
(5) 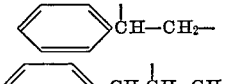
(6) 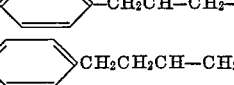
(7) 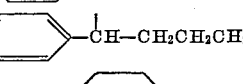
(8) 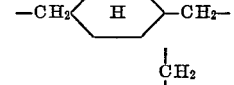
(9) 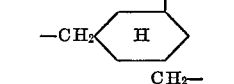
(10) 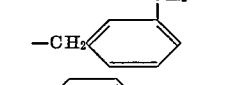
(11) 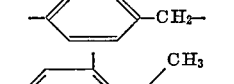
(12) 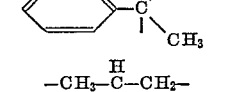
(13) 
(14) 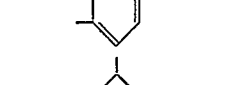
(15) 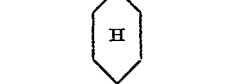
(1) 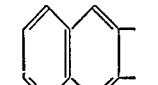
(2) 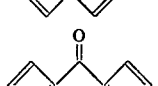
(3) 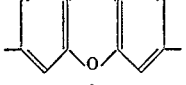
(4) 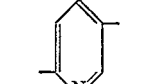

It is of course clear that other non-chromophoric substituents may be present in the above radicals, e.g., —CHClCHCl—
—CHBrCH₂CHBr—

The general procedure for preparing the compounds of this invention involves a condensation of a selected alkyl (or alkenyl) hereto ketone with an active methylene compound, e.g., (a) malononitrile,
(b) cyanoacetamide followed by reduction of —CONH₂ group to a —CN group, or
(c) a cyanomethylene ester or amide, preferably carrying out the condensation in the presence of an acidic catalyst.

Examples of ketones which can be employed are:

2-thienyl methyl ketone
1-(2-thienyl)-1-propanone (2-thienyl ethyl ketone)
2-furyl methyl ketone
3-thienyl methyl ketone
2-thienyl n-propyl ketone
2-thienyl isobutyl ketone
2-thienyl n-pentyl ketone
2-thienyl n-hexyl ketone
2-thienyl n-heptyl ketone
2-thienyl n-nonyl ketone
2-thienyl n-decyl ketone
2-thienyl n-undecyl ketone
2-thienyl n-tridecyl ketone
2-thienyl n-heptadecenyl ketone
2-thienyl n-isobutoxy methyl ketone
2-thienyl n-heptadecyl ketone
2-furyl ethyl ketone
2-furyl isobutyl ketone
2-pyrryl methyl ketone (2-pyrrolyl methyl ketone)
3-pyrryl methyl ketone
4-pyrazolyl methyl ketone
2-crotonyl thiophene (1-(2-thienyl)-2-buten-1-one)
2-thienyl-3-butenone
3-isoxazolyl methyl ketone
5-isoxazolyl methyl ketone
2-pyrrolyl isobutyl ketone
methyl 2-pyridyl ketone
methyl 3-pyridyl ketone (β-acetyl pyridine)
methyl 4-pyridyl ketone
n-butyl 3-pyridyl ketone
tert.-butyl 3-pyridyl ketone
2-benzofuranyl methyl ketone
3-benzofuranyl methyl ketone
3-benzofuranyl ethyl ketone
2-benzofuranyl ethyl ketone
5-thiazolyl methyl ketone
5-thiazolyl ethoxymethyl ketone
2-furyl n-amyl ketone
2-furyl n-heptyl ketone

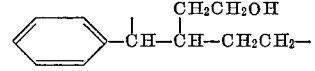

2-furyl n-nonyl ketone
2-furyl n-decyl ketone
2-furyl n-undecyl ketone
2-furyl n-tridecyl ketone
2-furyl n-heptadecyl ketone
2-furyl n-heptadecenyl ketone
2,4-dimethyl-3-thienyl methyl ketone
2,5-dimethyl-3-furyl methyl ketone
2,5-dichloro-3-thienyl methyl ketone
4,5-diethyl-2-thiazolyl methyl ketone
2,5-diethyl-3-thienyl methyl ketone
2,5-di-tert.butyl-2-thienyl methyl ketone
2,5-di-tert.butyl-3-thienyl methyl ketone
benzyl 5-bromo-2-thienyl ketone
benzyl 5-chloro-2-thienyl ketone
benzyl 2,5-dimethyl-3-thienyl ketone
benzyl 4-hydroxy-5-benzofuranyl ketone
5-bromo-2-furyl methyl ketone
5-bromo-3-pyridyl methyl ketone
bromo-2-pyrrolyl methyl ketone
5-bromo-2-thienyl methyl ketone 4-butyl-2,5-diethyl-3-thienyl methyl ketone
5-sec.butyl-2-thienyl methyl ketone
4-tert.butyl-2-thienyl methyl ketone
5-chloro-2-thienyl methyl ketone
5-(p-chlorophenyl)-2-thienyl methyl ketone
4-isopropyl-3-pyrolyl methyl ketone
5-ethyl-2-thienyl methyl ketone
5-(ethylthio)-2-furyl methyl ketone
2,5-dimethyl-4-oxazolyl methyl ketone
4,5-dimethyl-3-isoxazolyl methyl ketone
2,3-dimethyl-6-indolyl methyl ketone
1,2-dimethyl-3-indolyl trifluoromethyl ketone
3,5-dimethyl-2-pyrrolyl methyl ketone
2,5-dimethyl-3-pyrrolyl methyl ketone
2,4-dimethyl-3-pyrrolyl methyl ketone
5(1,1-dimethylpropyl)-2-thienyl methyl ketone
5-ethyl-3,4-dimethyl-2-pyrryl methyl ketone
ethyl-2,4-dimethyl-3-pyrryl methyl ketone
2-thiazolyl methyl ketone
4,5-dimethyl-2-thiazolyl methyl ketone
2-thiazolyl ethyl ketone
2-thiazolyl isopropyl ketone
5-methyl-2-thiazolyl methyl ketone
5-ethyl-2-thiazolyl methyl ketone
5-n-propyl-2-thiazolyl methyl ketone
methyl 3-methyl-4-pyrazolyl ketone
methyl 2-methyl-3-pyridyl ketone
methyl 6-methyl-3-pyridyl ketone
methyl 5-methyl-2-pyridyl ketone
methyl 6-methyl-2-pyridyl ketone
methyl 1-methyl-3(pyridyl)-2-pyrrolyl ketone
methyl 1-methyl-5(pyridyl)-3-pyrrolyl ketone
methyl 1-methyl-2-pyrrolyl ketone
methyl 2-methyl-3-pyrrolyl ketone
methyl 5-methylsulfonyl-2-furyl ketone
methyl 4-methyl-5-thiazolyl ketone
methyl 4-methyl-2-thiazolyl ketone
methyl 5-methyl-2-thiazolyl ketone
methyl 2-methyl-3-thienyl ketone
methyl 3-methyl-2-thienyl ketone
methyl 4-methyl-2-thienyl ketone
methyl 5-methyl-2-thienyl ketone
1-(6-methyl-3-pyridyl)-1-butanone
1-(5-methyl-2-pyrrolyl)-1-butanone
methyl 5-(2-thienyl)-2-thienyl ketone
methyl 5-(p-tolyl)-2-thienyl ketone
methyl 2,4,5-triethyl-3-thienyl ketone
methyl 3,4,5-trimethyl-2-thienyl ketone
2,5-dimethyl-3-thienyl methyl ketone
2-thienyl styryl ketone
5-hexyl-3-isoxazolyl methyl ketone
5-heptyl-2-thienyl methyl ketone
methyl 2-methyl-5-p-tolyl-3-thienyl ketone
methyl 5-methyl-2-p-tolyl-3-thienyl ketone
methyl 5-octyl-2-thienyl ketone
methyl 5-pentyl-2-thienyl ketone
methyl 5-phenethyl-2-thienyl ketone
methyl 5-phenyl-3-isoxazolyl ketone
methyl 3-propyl-2-indolyl ketone
methyl 3-pyrazolyl ketone
methyl 5-pyrazolyl ketone
methyl 2-pyridyl ketone
methyl 4-pyridyl ketone
2-methyl-5-pyridyl trichloromethyl ketone
methyl 1-tetradecyl-2-pyrrolyl ketone Illustrative active-methylene compounds are:

alkyl α-cyanoacetates, e.g., ethyl α-cyanoacetate
hydroxyalkyl α-cyanoacetates
chloroalkyl α-cyanoacetates
alkenyl α-cyanoacetates, e.g., allyl α-cyanoacetate
phenyl α-cyanoacetate
tolyl α-cyanoacetate
p-carboxyphenyl α-cyanoacetate
decenyl-1-α-cyanoacetate 4-pyrazolyl-α-cyanoacetate
4-methyl-2-thiazolyl-α-cyanoacetate
4-ethoxyphenyl-α-cyanoacetate
p-quinolyl-α-cyanoacetate
p-sulfamylphenyl-α-cyanoacetate
glyceryl-1,3-bis(α-cyanoacetate)
bis-cyanoacetyl-o-cyclohexylenediol
bis-cyanoacetyl-p-xylylene glycol, and the like In addition to the above contemplated derivatives (I and II), polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as:

ethylene oxide
propylene oxide
butylene oxide
butylene dioxide
isobutylene oxide
glycidol
epichlorohydrin
butadiene dioxide
styrene oxide and the like to yield the corresponding polyoxyalkylated products. Among the types of compounds which are reactive in this manner are hydroxy compounds
amide compounds
carboxyl compounds, etc.

From one to about 200 moles of oxyalkylating agent may be condensed with the said reactive compounds.

The following examples will serve to illustrate the present invention without being deemed limitative thereof. Parts are by weight unless otherwise indicated.

EXAMPLE 1

Into a 500 cc. flash set up with a Vigreux column, there are charged:

31.5 g. (0.25 M) 2-acetothienone (methyl 2-thienyl ketone)
31.9 cc. (33.9 g.) ethyl-α-cyanoacetate
0.5 g. ammonium acetate C.P., anhydrous
9.5 cc. glacial acetic acid and
75 cc. benzene The charge which is heated to reflux and adjusted at 96° C., is stirred at this temperature for 1 hour. Then every hour for 10 hours, there are added 2 cc. of a solution composed of 5 g. of ammonium acetate dissolved in glacial acetic acid to a total volume of 20 cc.; refluxing is continued thereafter for a total of 24 hours of reflux at 96° C. An additional 1.0 g. of ammonium acetate is added and the charge is stirred for 2 hours at 96° C. At the end of this time, a total of 14 cc. of water has been collected. The benzene is evaporated off; the residue is washed with water and the material is then distilled. The yield of final product is 32 g.; said product has a boiling point of 145–146° C. at 1.3–1.5 mm. and a $K_{max.}=64.0$ at 332.

EXAMPLE 2

Preparation of ethyl-α-cyano-β-undecyl-β-(2-thienyl)acrylate (A) Preparation of lauroyl thiophene (undecyl-2-thienyl ketone).—Into a dry 5 liter flask fitted with a stirrer, thermometer, calcium chloride drying tube, cooling bath, reflux condenser, and dripping funnel, there are charged 219 g. lauroyl chloride (1 mol)
86 cc. (92 g.) thiophene (1.1 mol)
1300 cc. benzene The charge is cooled to 6° C. and while maintaining the temperature at 6 to 10° C. there are added, dropwise over 3 hours, 58 cc. (123 g.)=0.473 M) of anhydrous stannic chloride. After the addition is completed, the charge is stirred for 30 minutes at 10° C., then allowed to come to room temperature and stirred at this temperature for 4 hours. There are then added 750 cc. of 10% hydrochloric acid and this is followed by vigorous stirring for 30 minutes. Following this stirring, two layers are formed and the benzene layer is collected, washed with 750 cc. of 10% hydrochloric acid, then with 1 liter of water and finally with 750 cc. of 5% aqueous soda ash. The benzene layer is then dried over calcium chloride and the benzene subsequently distilled. The residue is then distilled to yield 164 g. of the desired ketone having a boiling point of 169°–171° C. at 1.5 mm.

(B) Condensation of Product 2A with ethyl-α-cyanoacetate.—The procedure of Example 1 is generally repeated using 53.2 g. of Product 2A (0.2 mol), 25.5 cc. of ethyl-α-cyanoacetate (0.24 mol), 9.6 cc. of glacial acetic acid, 1 g. of C.P. ammonium acetate, anhydrous, and 75 cc. benzene as the charge. The reaction is run at reflux at 96° C. for 22 hours, adding after 2, 4 and 6 hours of reflux time, 1 g. of ammonium acetate C.P. Total water collected is 11.5 cc. The final product is isolated as in Example 1 and the yield is 23.69 of product; boiling point 185–197/1.0 mm.; $K_{max}$=25.06 (at 332 m$\mu$).

EXAMPLE 3

The procedure of Example 2 is repeated using as the charge 53.2 g. lauroyl thiophene (0.2 mol)
13.2 g. malononitrile (0.2 mol)
9.6 cc. glacial acetic acid
3.8 g. ammonium acetate C.P. anhydrous, and
45 cc. benzene Refluxing is done at 96° C. and maintained at this temperature by adding more benzene as necessary.

EXAMPLE 4

Example 3 is repeated employing 0.2 mol of 2-acetothienone in place of lauroyl thiophene, 15.9 g. of malononitrile, 0.4 g. ammonium acetate (C.P.), 6.0 cc. glacial acetic acid and 76 cc. benzene as the charge. Every hour for 10 hours at reflux (96° C.) there is added 1.5 cc. of a solution of:

4 g. ammonium acetate C.P. and
10 cc. glacial acetic acid diluted with acetic acid (85%) to 15 cc.

Stirring is continued for a total of 24 hours at 96° C. Total water collected=9.5 cc. The benzene is evaporated off and the residue is washed several times with water. Solid is then recrystallized twice from ethanol and nuchar. Yield is 13 g. of product; M.P. 98.4–99.6° C. $K_{max}$=106 (at 342 m$\mu$).

EXAMPLE 5

Example 1 is repeated using the following hetero ketones in equivalent amounts, in place of 2-acetothienone:

(A) 2-furyl methyl ketone
(B) 2-thienyl-n-hexyl ketone
(C) 2-thienyl-n-heptadecyl ketone
(D) 2-crotonyl thiophene
(E) 2-thienyl-3-butenone
(F) 2-furyl isobutyl ketone
(G) methyl 3-pyridyl ketone
(H) 5-thiazolyl methyl ketone
(I) 3-isoxazolyl methyl ketone
(J) 2-pyrrolyl isobutyl ketone
(K) 3-benzofuranyl ethyl ketone
(L) 2,5-dichloro-3-thienyl methyl ketone
(M) benzyl 5-bromo-2-thienyl ketone
(N) 5-(p-chlorophenyl)-2-thienyl methyl ketone
(O) 5-(ethylthio)-2-furyl methyl ketone
(P) 2-thienyl styryl ketone
(Q) methyl 5-(p-tolyl)-2-thienyl ketone
(R) methyl 5-phenyl-3-isoxazolyl ketone
(S) 2-furyl n-heptadecenyl ketone
(T) methyl 5-methylsulfonyl-2-furyl ketone All of the resultant compounds exhibit significant absorption characteristics (i.e., $K_{max}$ from 25 to 125 at wavelengths from 320 to 360 m$\mu$).

EXAMPLE 6

Example 1 is again repeated except that in place of ethyl α-cyanoacetate the following α-cyanoacetates are used in equivalent amounts:

(A) isobutyl α-cyanoacetate
(B) hydroxyisopropyl α-cyanoacetate
(C) 3-chloro(n-propyl) α-cyanoacetate
(D) allyl α-cyanoacetate
(E) phenyl α-cyanoacetate
(F) p-tolyl α-cyanoacetate
(G) p-carboxyphenyl α-cyanoacetate
(H) 4-ethoxyphenyl α-cyanoacetate
(I) p-sulfamylphenyl α-cyanoacetate
(J) p-methylsulfonyl phenyl α-cyanoacetate
(K) p-chlorophenyl α-cyanoacetate
(L) p-hydroxyphenyl α-cyanoacetate
(M) p-isopropylphenyl α-cyanoacetate
(N) 4-pyrazolyl α-cyanoacetate
(O) cyclohexyl α-cyanoacetate
(P) cyclopentyl α-cyanoacetate Excellent products are obtained in each instance.

EXAMPLE 7

Each of the ketones A through T in Example 5 is condensed with malononitrile as in Example 4, to yield the corresponding alkyl (or alkenyl)-hetero dinitriles which are all outstanding absorbers.

EXAMPLE 8

Example 1 is again repeated using the following cyanomethylene amides, in equivalent amounts in place of ethyl α-cyanoacetate.

(A) α-cyanoacetamide
(B) α-cyano-N,N-dimethyl acetamide
(C) α-cyano-N,N-diallyl acetamide
(D) α-cyano-N,N-bis(β-hydroxyethyl) acetamide
(E) α-cyano-N,N-bis(methoxyethyl) acetamide
(F) α-cyano-N,N-bis(carbomethoxyethyl) acetamide
(G) α-cyano-acetomorpholide
(H) α-cyano-N-methyl-N-ethyl acetamide

EXAMPLE 9

Example 1 is again repeated employing the following di(α-cyano) esters and amides in place of ethyl α-cyanoacetate. The amounts used are 1/2 on a molar basis in each instance of the ethyl α-cyanoacetate.

(A) CNCH$_2$COOCH$_2$CH$_2$OOCCH$_2$CN (prepared from 1 mol ethylene glycol and a slight excess of 2 mols of cyanoacetic acid as described in U.S. Pat. 2,426,056)
(B) 1,3-glyceryl bis(α-cyanoacetate)
(C) 1,4-xylylenglycol di-(α-cyanoacetate)
(D) N,N'-bis-p-phenylene-bis-cyanoacetamide
(E) N,N'-bis(cyanoacetyl)-pentamethylenediamine
(F) N,N'-bis(cyanoacetyl)-ethylenediamine

EXAMPLE 10

The compound of Example 8–D is polyoxyethylated by conventional methods using 1.2% by weight of potassium hydroxide per mol of compound 8–D and reacting the compound with 6 mols of ethylene oxide in an autoclave at 80° C. The resultant product has the formula:

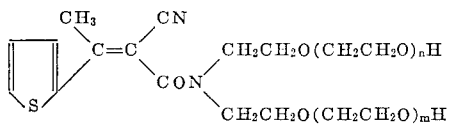

wherein $n+m=6$.

EXAMPLE 11

The product of Example 8–D is oxypropylated with 10 mols of propylene oxide following the general procedure of Example 10, to give a compound containing 10 oxypropyl groups.

EXAMPLE 12

The product of Example 11 is further oxyethylated with 12 mols of ethylene oxide to give a product with 12 additional oxyethyl groups.

The product of Example 2 is incorporated into polyethylene (melting point 120° C.) using 0.2% by weight thereof based on the weight of the polyethylene. Films are prepared from this composition and compared with similar films absent the absorber after exposure for 100 hours in an ultra-violet light fadeometer. The film with the absorber shows substantially no change, whereas the other evidences severe degradation as manifested by a distinct discoloration and many dark spots.

EXAMPLE 14

The product of Example 3 is incorporated into a polyacetal resin (prepared from the polymerization of formaldehyde) in an amount of 1% by weight based on the weight of the resin. Films are prepared from this resin composition and exposed in a weatherometer for 100 hours along with a similar film containing no additive. The latter film shows severe degradation whereas the one containing the stabilizer is substantially unchanged.

EXAMPLE 15

The product of Example 1 is added to a mixture on a steam bath of 9 oz. carnauba wax, 1.5 pints turpentine, 1.75 pints water containing 2 oz. of soap, the mixture to contain 2% of the absorber of Example 1 based on the weight of the wax. The resultant wax emulsion is used as a wax coating on stained and varnished oak. Excellent protection is afforded the wood by the instant composition.

The compounds of the present invention as demonstrated in the foregoing examples have outstanding and unusual solubility characteristics in greatly diversified types of solvents. Not only do these compounds exhibit infinite solubility in many different classes of solvents, but they are also extremely soluble in many diverse types of polymers, resins, waxes and the like, and therefore they are particularly suitable and adaptable for the stabilization of such materials as exemplified above. The non-oxyalkylated products are insoluble in water. Those compounds which contain lesser amounts of oxyalkyl groups, that is, up to about 4–6 groups per molecule, are in general less soluble in the non-polar solvents but are readily dispersible in water. The compounds containing larger amounts of alkylene oxide, that is, above about 6 mols thereof per mol of base compound, range from soluble to very soluble in water with the solubility increasing as the number of oxyalkylene groups increases.

The ultra-violet absorbing compounds of the present invention may be used to stabilize all organic materials which are susceptible to ultra-violet degradation and are particularly useful in the stabilization of resins and plastics, whether they be in the form of films or molded products and either clear, opaque, semi-opaque or translucent. Foam, plastic and fibers are also admirably stabilized by these compounds. Pigments, polishes, creams, lotions, paints, enamels, varnish films, and dye-stuffs when susceptible to ultra-violet degradation have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight based upon the organic solids weight to be stabilized may be used.

Other variations in and modifications of the described processes which will be obvious to those skilled in the art can be made in this invention without departing from the scope or spirit thereof.

We claim:
1. An essentially colorless compound of the formula:

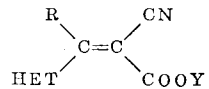

wherein

R is $C_{3-30}$ alkenyl
HET is thienyl, and
Y is $C_{1-30}$ alkyl.

2. A compound as defined in claim 1 wherein Y is ethyl.
3. Ethyl α-cyano-β-undecyl-β-2-thienyl-acrylate.
4. Ethyl α-cyano-β-n-hexyl-β-2-thienyl-acrylate.
5. Ethyl α-cyano-β-n-heptadecyl-β-2-thienyl-acrylate.

References Cited

UNITED STATES PATENTS 2,623,060   12/1952   Cragoe _____ 260—465
3,106,566   10/1963   McCall et al. _____ 260—332.2

OTHER REFERENCES

Kendall, et al., C. A. 48: 13500(e) (November 1954).
Popp, et al. C. A. 55: 27002(e) (December 1961).
Lawesson, C. A. 62: 10332(f) (April 1965).

HENRY R. JILES, Primary Examiner

C. M. SHURKO, Assistant Examiner

U.S. Cl. X.R.

106—76; 252—300; 260—248, 250, 251, 287, 294.8, 294.9, 295, 302, 307, 308, 309, 309.2, 310, 326.12, 326.13, 326.14, 326.3, 327, 330.5, 345.2, 345.7, 345.8, 346.2, 347.2, 347.3; 424—174